Jan. 1, 1929.
J. B. DAVIDSON
1,697,678
COMBINED PLOW AND PULVERIZER
Filed March 5, 1927
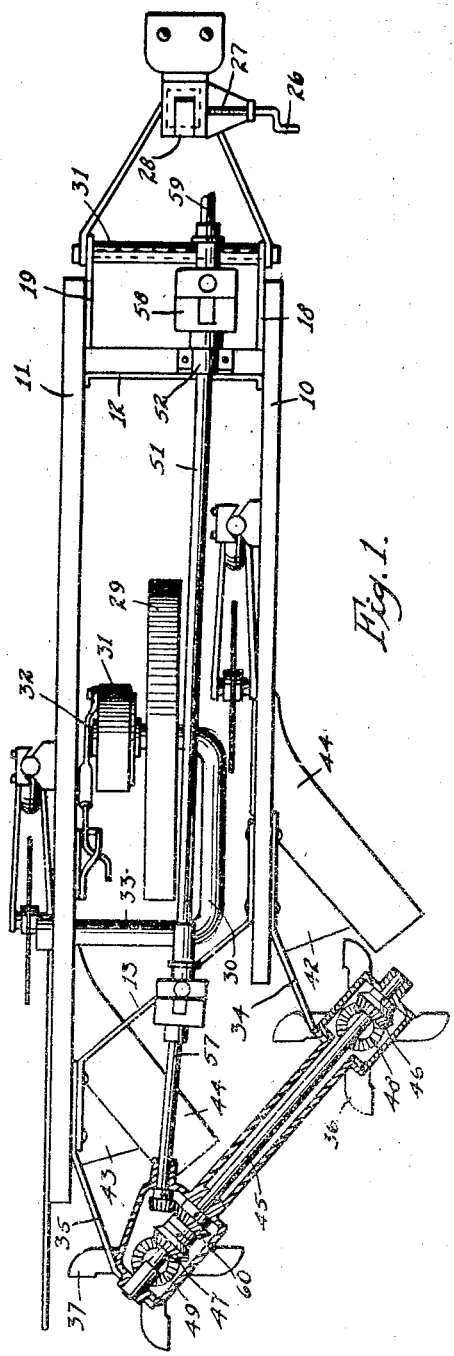
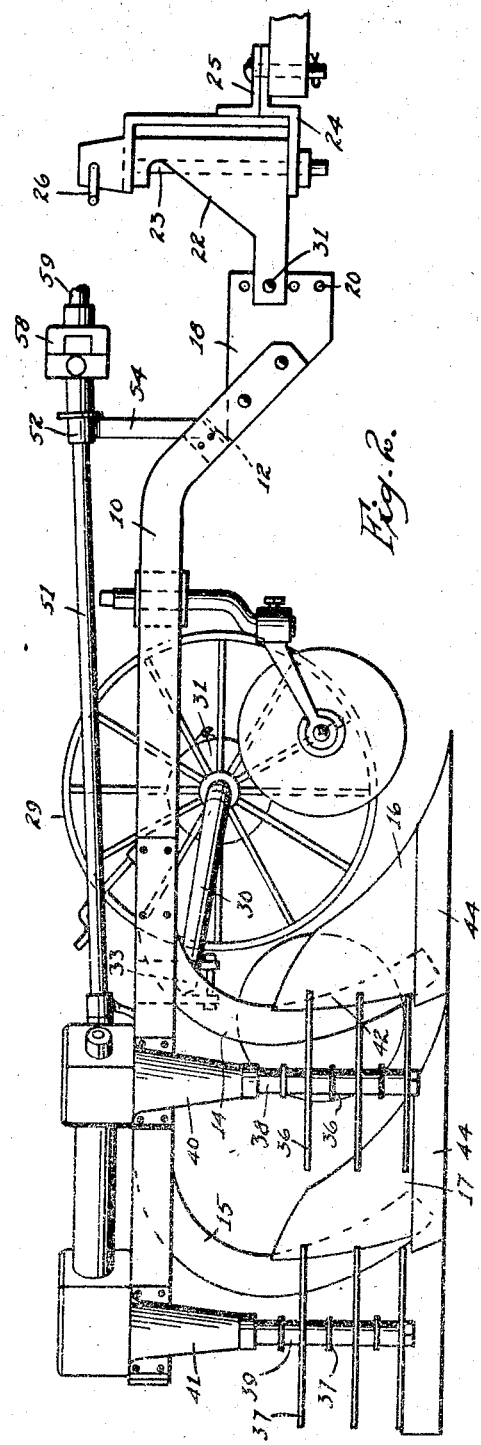
Inventor.
Jay Brownlee Davidson.
By Orwig & Hague Attorneys.

Patented Jan. 1, 1929.

1,697,678

UNITED STATES PATENT OFFICE.

JAY BROWNLEE DAVIDSON, OF AMES, IOWA, ASSIGNOR, BY MESNE ASSIGNMENTS, TO GENERAL IMPLEMENT COMPANY, A CORPORATION OF DELAWARE.

COMBINED PLOW AND PULVERIZER.

Application filed March 5, 1927. Serial No. 173,002.

An important feature of the invention resides in the use of the pulverizer device as a component part of the plow structure and this is accomplished by substituting a pulverizer, rotatable in a clockwise direction about a vertical axis, for the greater part of the plow moldboard, thereby eliminating the relatively great friction created between the furrow slice and moldboard in ordinary plow constructions.

A feature of the invention resides in the provision of readily removable mountings or supports for the pulverizer members in order to provide for the conversion of the implement into a plow structure alone or into a combined plow and soil pulverizer as the circumstances may require.

Other features of the invention will be hereinafter referred to.

In the drawings, in which a preferred embodiment of the invention has been selected for illustration:

Figure 1 is a plan view of a combined plow and soil pulverizer embodying the invention;

Figure 2 is a view in side elevation of the device shown in Figure 1;

Referring to the drawings for a more detailed description of the invention, a plow construction is shown which includes a rigid framework made up of longitudinally extending members comprising a plow beam 10 and a plow beam 11. The plow beams are connected at their forward ends by a spacing bar 12 and adjacent their rearward ends by means of a diagonally extending spacing bar 13. The combined beam and frame members 10 and 11 occupy a parallel relation with each other and support at their rearward and downwardly curved ends 14 and 15 a pair of plows 16 and 17. The plow framework includes at its forward end a pair of vertically disposed hitch plates 18 and 19 which are rigidly attached to the forward extremities of the beam members 10 and 11. The hitch plates are provided with vertical series of holes 20 through which a pivot pin or rod 21 may be passed to provide a pivotal connection between the hitch plates 18 and 19 and a V-shaped tractor member 22 which is pivoted for horizontal movement about a vertical pin 23 in a U-shaped frame member 24. The frame member 24 is provided at its forward extremity with a hitch plate 25 adapted to be attached to the drawbar head of a tractor.

The vertical pivot pin 23 is mounted for lateral adjustment at its upper end, the adjustment being provided by means of a hand crank 26 readily accessible from the driver's seat of the tractor. The hand crank is provided with a screw-threaded section 27 which cooperates with a nut 28 mounted on the upper end of the pin 23, the lateral adjustment thus provided serving to tilt the pivot pin 23 laterally about its lower portion as a fulcrum to thereby adjust the lateral level of the plow structure.

The plow framework is supported at two points only, one point being the connection referred to between the hitch plate 25 and the drawbar head of the tractor, the other point being through the ground wheel 29 which occupies a centrally disposed position both longitudinally and laterally with relation to the plow framework. The ground wheel 29 has a substantial diameter such that when the plows are in their lowered or operative position, the upper portion of the ground wheel occupies a position higher than that of the beam members 10 and 11 of the plows. The ground wheel is supported for rotation on one arm of a pivotally mounted axle or bracket member 30. Means, including a clutch device 31 and a connecting rod 32, are provided for swinging the axle or bracket member 30 about its pivot arm 33 to thereby bring about a vertical adjustment of the plow framework with relation to the ground wheel. The vertical adjustment or lifting and lowering of the plow framework which is thus provided is effected through the rotation of the weight supporting ground wheel 29 and the clutch connection 31. This particular structure forms no essential part of the invention herein claimed but is described and claimed in the copending application already referred to.

The rearward portions of each of the plow beam members 10 and 11 are provided with rearwardly and outwardly extending bracket members 34 and 35 which are arranged to support a pair of rotatable soil pulverizer devices 36 and 37. The soil pulverizer devices 36 and 37 include vertical shafts 38 and 39 journaled at their upper ends in bearing housings 40 and 41 supported by the bracket members 34 and 35. The depending position of the soil pulverizing devices 36 and 37, which is thus provided, results in the cooperation of the soil pulverizing devices with the soil which is in the act of being turned by the plow.

In order to eliminate as far as possible the friction of travel of the furrow slice along the face of the moldboard with a resulting loss in power, the moldboard structure arranged for use with pulverizers is shortened or restricted in length so that the travel of the furrow slice along the face of the moldboard is very materially lessened. The shortened moldboards referred to are shown with their rearward edges terminating at 42 and 43 in Figure 2 of the drawing with a resulting mounting of the pulverizer devices in a position which in part overlies the rearward ends 44 of the share portions of the plow. I thus provide a minimum moldboard surface area and, in effect, substitute for the rearward portion of the moldboard a moving moldboard structure, that is, the rotating tiller device.

It has been found with this arrangement of structure that the plow can be pulled and the rotatable pulverizers operated with a marked economy in the use of power. The result of this is that the structure shown and described is in actual practice readily pulled and operated by means of a well known tractor of moderate power that has gone in extensive and universal use.

In order to operate the pulverizer or tiller shafts 38 and 39, a diagonally extending drive shaft 45 is provided at its opposite ends with beveled pinions 46 and 47 which mesh with beveled gears 48 and 49 carried by the upper extremities of the drive shafts 38 and 39. The drive shaft 45 accordingly provides a common driving means for the two pulverizer shafts 38 and 39. The drive shaft 45 is in turn driven through a pair of beveled gears 50 and 60 with a main driving shaft 51 which extends throughout the length of the plow framework being supported in bearings 52 and 53 mounted on bracket members 54 and 55 attached in turn to the frame members 13 and 12 of the plow framework. The driving shaft 51 is provided with a universal coupling member 56 at its rearmost extremity which provides a connection with a shaft 57 terminating in the beveled gear 50 already referred to. At its forward end the drive shaft 51 terminates in a universal coupling member 58 to which a power shaft 59, leading forward to a driving connection with the power plant of the tractor, is in turn connected. The power shaft may be connected to a centrally disposed power shaft in the tractor terminating adjacent the tractor drawbar head or, if desired, the power shaft may lead to a power take off device mounted on the right-hand side of the tractor. For this purpose, the drive shaft 51 is mounted adjacent the right-hand side of the framework of the plow and to the right of the centrally disposed weight supporting wheel 29.

In order to provide for the use of the structure described either as a plow alone or as a combined plow and soil tillage implement, the pulverizer devices 36 and 37 are so mounted on the plow framework that they may be readily disconnected therefrom or connected thereto as may be desired. For this purpose, the bearing housings 40 and 41 are adapted for ready removal from the bracket members 34 and 35 on which they are mounted. In addition, in order to further adapt the device for functioning either as a plow alone or as a combined plow and soil tillage implement, the short moldboards, shown in Figure 2 of the drawings, for use with the pulverizer members 36 and 37 may be readily removed and full length moldboard members substituted therefor. It will be seen that the interchangeable moldboard thus provided serves to particularly adapt the apparatus for use in either of its functions.

With the construction described, in which the pulverizer devices form part of the combination implement, it will be seen that the pulverizers are so mounted as to engage the soil lifted by the relatively short moldboards 42 and to reduce it to a finely divided condition and at the same time throw the finely divided soil outwardly into the adjacent furrow, the direction of rotation of the pulverizer being clockwise for this purpose. The utilization of the pulverizers in this way to perform the function ordinarily performed by the moldboard as well as to disintegrate the soil has the effect of reducing the consumption of power required to pull the machine since the friction of the furrow slice against the relatively long face of the moldboard in ordinary plow constructions is eliminated and the rotating pulverizers substituted therefor.

It will be seen that an agricultural implement has thus been provided which provides not only a sturdy, simple and relatively inexpensive plow structure but it also provides a combination implement through the operation of which ground can be plowed and at the same time worked into a finely divided condition which provides a completely prepared seed bed for the full depth of the plowed ground. The practicability of the machine shown and described has been recently demonstrated in operations conducted in wet and gummy soils, such as are found in certain regions in Texas.

What I claim is:

1. In a plow of the share and moldboard type, a forwardly extending beam, a bracket member mounted on a rearward portion of the beam to extend rearwardly and outwardly therefrom, a rotatable soil pulverizer having a vertical shaft mounted on its upper end on said bracket member, the moldboard of the plow having its rearward edge terminating short of the rearward end of the share, and said pulverizer operating above the rearward end of the share and closely adjacent the rearward edge of the moldboard.

2. In an implement of the class described the combination of a plow share, a furrow slice lifting member associated with the plow share and having its rear end terminated short of the rear end of the plow share, a soil pulverizer comprising a substantially upright shaft and substantially horizontal blades fixed thereto, means for rotating the shaft, the location of the shaft relative to the share and lifting member being such that the pulverize blades will during part of their movement pass directly above the rear end of the plow share and closely adjacent the rearward edge of the lifting member to engage the furrow slice just as it passes beyond the lifting member and pulverize it and throw it outwardly.

JAY BROWNLEE DAVIDSON.